(12) United States Patent
Bhamidipaty et al.

(10) Patent No.: US 10,185,594 B2
(45) Date of Patent: Jan. 22, 2019

(54) SYSTEM AND METHOD FOR RESOURCE IDENTIFICATION

(75) Inventors: Anuradha Bhamidipaty, Bangalore (IN); Kalapriya Kannan, Bangalore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 542 days.

(21) Appl. No.: 12/608,672

(22) Filed: Oct. 29, 2009

(65) Prior Publication Data
US 2011/0106515 A1 May 5, 2011

(51) Int. Cl.
G06F 9/50 (2006.01)

(52) U.S. Cl.
CPC .......... G06F 9/5055 (2013.01); G06F 9/5044 (2013.01)

(58) Field of Classification Search
USPC ............................ 703/1, 6; 705/17.2; 707/763
See application file for complete search history.

(56) References Cited

U.S. PATENT DOCUMENTS

| | | | | |
|---|---|---|---|---|
| 6,249,882 B1 * | 6/2001 | Testardi | | 714/38.14 |
| 6,529,950 B1 * | 3/2003 | Lumelsky et al. | | 709/218 |
| 6,968,533 B1 * | 11/2005 | Ueda et al. | | 717/100 |
| 7,137,100 B2 * | 11/2006 | Iborra et al. | | 717/106 |
| 7,233,956 B2 * | 6/2007 | Balducci et al. | | |
| 7,448,022 B1 * | 11/2008 | Ram | | G06F 8/00 717/120 |
| 7,509,610 B1 * | 3/2009 | New | | 716/113 |
| 7,546,577 B2 * | 6/2009 | Do et al. | | 717/108 |
| 7,606,250 B2 * | 10/2009 | Shoham et al. | | 370/412 |
| 7,676,552 B2 * | 3/2010 | Eilam et al. | | 709/218 |
| 7,693,983 B1 * | 4/2010 | Gupta | | H04L 12/1471 709/221 |
| 7,702,779 B1 * | 4/2010 | Gupta et al. | | 709/224 |
| 7,849,459 B2 * | 12/2010 | Burkhart et al. | | 717/174 |
| 7,899,694 B1 * | 3/2011 | Marshall et al. | | 705/7.11 |
| 7,992,031 B2 * | 8/2011 | Chavda et al. | | 714/2 |
| 8,042,098 B2 * | 10/2011 | Do et al. | | 717/123 |
| 8,073,799 B2 * | 12/2011 | Baldwin et al. | | 706/46 |
| 8,151,248 B1 * | 4/2012 | Butler et al. | | 717/124 |
| 8,209,211 B2 * | 6/2012 | Engle et al. | | 705/7.23 |
| 9,734,228 B2 * | 8/2017 | Barrett | | G06F 17/30592 |
| 2002/0046394 A1 * | 4/2002 | Do et al. | | 717/108 |
| 2002/0170042 A1 * | 11/2002 | Do et al. | | 717/143 |
| 2003/0084135 A1 * | 5/2003 | Narain | | 709/223 |
| 2003/0216951 A1 * | 11/2003 | Ginis et al. | | 705/8 |
| 2004/0139088 A1 * | 7/2004 | Mandato | | H04L 12/5695 |
| 2004/0158567 A1 * | 8/2004 | Dettinger et al. | | 707/100 |
| 2004/0158577 A1 * | 8/2004 | Chu et al. | | 707/103 R |
| 2005/0021847 A1 * | 1/2005 | Rothman et al. | | 709/238 |
| 2005/0120344 A1 * | 6/2005 | Asare et al. | | 717/174 |
| 2005/0120347 A1 * | 6/2005 | Asare et al. | | 717/177 |
| 2005/0136939 A1 * | 6/2005 | Mountain et al. | | 455/453 |
| 2005/0177600 A1 * | 8/2005 | Eilam et al. | | 707/104.1 |
| 2005/0198244 A1 * | 9/2005 | Eilam et al. | | 709/223 |

(Continued)

Primary Examiner — Kibrom K Gebresilassie
(74) Attorney, Agent, or Firm — Ference & Associates LLC

(57) ABSTRACT

Systems and methods for resource identification. Preferably, this can be undertaken via modeling in which primary constraints include requirements and availability and building a resource map that includes alternatives which can help in the realization of the function.

25 Claims, 2 Drawing Sheets

(56) References Cited

U.S. PATENT DOCUMENTS

| | | | |
|---|---|---|---|
| 2005/0261884 A1* | 11/2005 | Sakamoto et al. | 703/13 |
| 2005/0278718 A1* | 12/2005 | Griffith et al. | 717/175 |
| 2006/0101453 A1* | 5/2006 | Burkhart et al. | 717/168 |
| 2006/0106585 A1* | 5/2006 | Brown et al. | 703/1 |
| 2006/0161910 A1 | 7/2006 | Bonsteel et al. | |
| 2006/0212540 A1* | 9/2006 | Chon et al. | 709/218 |
| 2006/0221823 A1* | 10/2006 | Shoham et al. | 370/229 |
| 2007/0006281 A1* | 1/2007 | Abhinkar et al. | 726/2 |
| 2007/0100987 A1* | 5/2007 | Aggarwal | G06F 11/3495 709/224 |
| 2007/0220241 A1* | 9/2007 | Rothman et al. | 713/1 |
| 2008/0126406 A1* | 5/2008 | Endabetla et al. | 707/103 R |
| 2008/0172263 A1* | 7/2008 | Heyman | 705/7 |
| 2008/0201701 A1* | 8/2008 | Hofhansl et al. | 717/168 |
| 2008/0228503 A1 | 9/2008 | Buchheit | |
| 2008/0244600 A1* | 10/2008 | Wong et al. | 718/104 |
| 2009/0031277 A1* | 1/2009 | McElvain | G06F 17/5072 716/104 |
| 2009/0086577 A1* | 4/2009 | Ledeczi et al. | 367/129 |
| 2009/0122706 A1* | 5/2009 | Alfano et al. | 370/237 |
| 2009/0249281 A1* | 10/2009 | Fritzsche et al. | 717/104 |
| 2009/0259682 A1* | 10/2009 | Baldwin et al. | 707/103 R |
| 2009/0265206 A1* | 10/2009 | Friedlander et al. | 705/9 |
| 2009/0281770 A1* | 11/2009 | Yatko et al. | 702/186 |
| 2009/0307308 A1* | 12/2009 | Siegemund et al. | 709/203 |
| 2010/0070449 A1* | 3/2010 | Arnold et al. | 706/48 |
| 2010/0083212 A1* | 4/2010 | Fritzsche et al. | 717/104 |
| 2010/0122238 A1* | 5/2010 | Kannan et al. | 717/123 |
| 2010/0250316 A1* | 9/2010 | Channabasavaiah et al. | 705/8 |
| 2010/0333102 A1* | 12/2010 | Balasubramanian | 718/103 |
| 2011/0022879 A1* | 1/2011 | Chavda et al. | 714/1 |
| 2011/0099548 A1* | 4/2011 | Shen et al. | 718/1 |
| 2011/0138374 A1* | 6/2011 | Pal | 717/169 |
| 2011/0191748 A1* | 8/2011 | Kannan et al. | 717/104 |
| 2012/0166771 A1* | 6/2012 | Ringseth | G06F 8/31 712/220 |
| 2014/0075357 A1* | 3/2014 | Flores | G06Q 10/0639 715/771 |
| 2014/0130014 A1* | 5/2014 | Jensen | G06F 11/3684 717/124 |

\* cited by examiner

SYSTEM AND METHOD FOR RESOURCE IDENTIFICATION

BACKGROUND

It is often the case that demands or requirements arise in which there is a need to implement a service on a target platform with resource pre-requisites. A problem often encountered in connection therewith is determining a feasible set of components, software and/or hardware, that are either present or are required to be present on the target platform to implement the requirement. Conventional efforts involve considerable manual effort. The time and effort involved is tremendous and tends to be highly error-prone for complex environments.

BRIEF SUMMARY

Broadly contemplated herein, in accordance with at least one presently preferred embodiment of the present invention, are systems and methods for resource identification. Preferably, this can be undertaken via modeling in which primary constraints include requirements and availability.

In summary, one aspect of the invention provides a system comprising: a resource identification tool having one or more processors and one or more modules executable by the one or more processors, the one or more modules comprising: computer program code configured to identify resources of a target platform which meet a predetermined functional requirement, via: modeling resource constraints relating to the functional requirement and the target platform; assigning the resource constraints into resource categories; determining additional resource constraints; and developing a resource map of resource alternatives for the functional requirement.

Another aspect of the invention provides a method comprising: identifying resources of a target platform which meet a predetermined functional requirement; said identifying comprising: modeling resource constraints relating to the functional requirement and the target platform; assigning the resource constraints into resource categories; determining additional resource constraints; and developing a resource map of resource alternatives for the functional requirement.

A further aspect of the invention provides a computer program product comprising: a computer readable storage medium having computer readable program code embodied therewith, the computer readable program code comprising:

computer program code configured to identify resources of a target platform which meet a predetermined functional requirement, via:

modeling resource constraints relating to the functional requirement and the target platform;

assigning the resource constraints into resource categories;

determining additional resource constraints; and developing a resource map of resource alternatives for the functional requirement.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
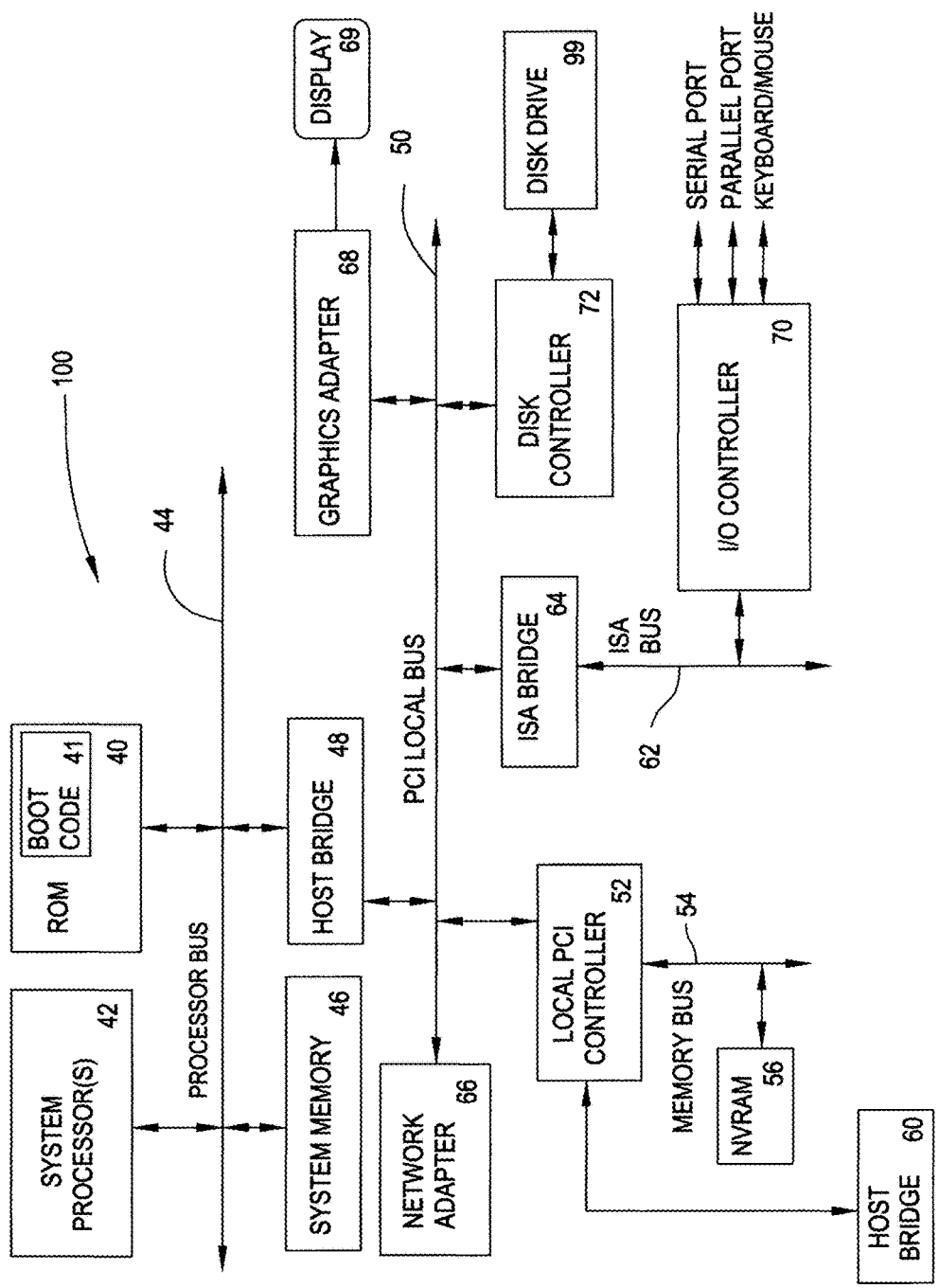
FIG. 1 illustrates a computer system.

It will be readily understood that the components of the embodiments of the invention, as generally described and illustrated in the figures herein, may be arranged and designed in a wide variety of different configurations in addition to the described presently preferred embodiments. Thus, the following more detailed description of the embodiments of the invention, as represented in the figures, is not intended to limit the scope of the embodiments of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings/figures. The following description is intended only by way of example and simply illustrates certain selected presently preferred embodiments of the invention as claimed herein.

Regarding the figures, the flowchart and block diagrams in the figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description now turns to the figures and select, presently preferred embodiments of the invention will be described. The following description of various embodiments of the invention is presented to highlight certain aspects of the invention, and the scope of the claimed embodiments of the invention will be pointed out in the appended claims.

Referring now to FIG. 1, there is depicted a block diagram of an illustrative embodiment of a computer system 100. The illustrative embodiment depicted in FIG. 1 may represent a device such as a game console, a set top box, a mobile device, a laptop, or a desktop or workstation computer. As is apparent from the description, however, embodiments of the invention may be implemented in any appropriately configured device or computing system, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to a LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, etc. A disk controller 72 connects a disk drive 99 with PCI local bus 50. The USB Bus and USB Controller (not shown) are part of the Local PCI controller (52).

Preferably, there are broadly contemplated herein, in accordance with at least one presently preferred embodiment of the present invention, methods and arrangements for identifying a set of components (software and/or hardware) on a target platform which meets a given requirement, preferably subject to constraints on resource prerequisites, availability and alternatives. Such methods and arrangements can be implemented essentially on any suitable computer system, such as the one indicated at 100 in FIG. 1.

By way of an illustrative and non-restrictive example, there may be a requirement to implement a web service wherein the resource requirements might be: webserver (Apache or Tomcat if Java is used; IIS if C++ is used), database (DB2 V9.1 or Oracle 10), XML Parser (xerces), complier and run-time environment (JVM for Java) etc. At the same time, resource availability on the target platform might be: no JVM, Apache available, DB2 V8.1 available, etc.

It can be appreciated that if an effort is made to manually find a feasible set of components which satisfy a requirement (such as that just specified), a great deal of time and effort could be expended, and also be error-prone for complex environments. Accordingly, there is broadly contemplated herein a systematic approach with automation that reduces such time and effort, while the possibility of performing a feasibility check up-front is also accommodated.

Figure 2:
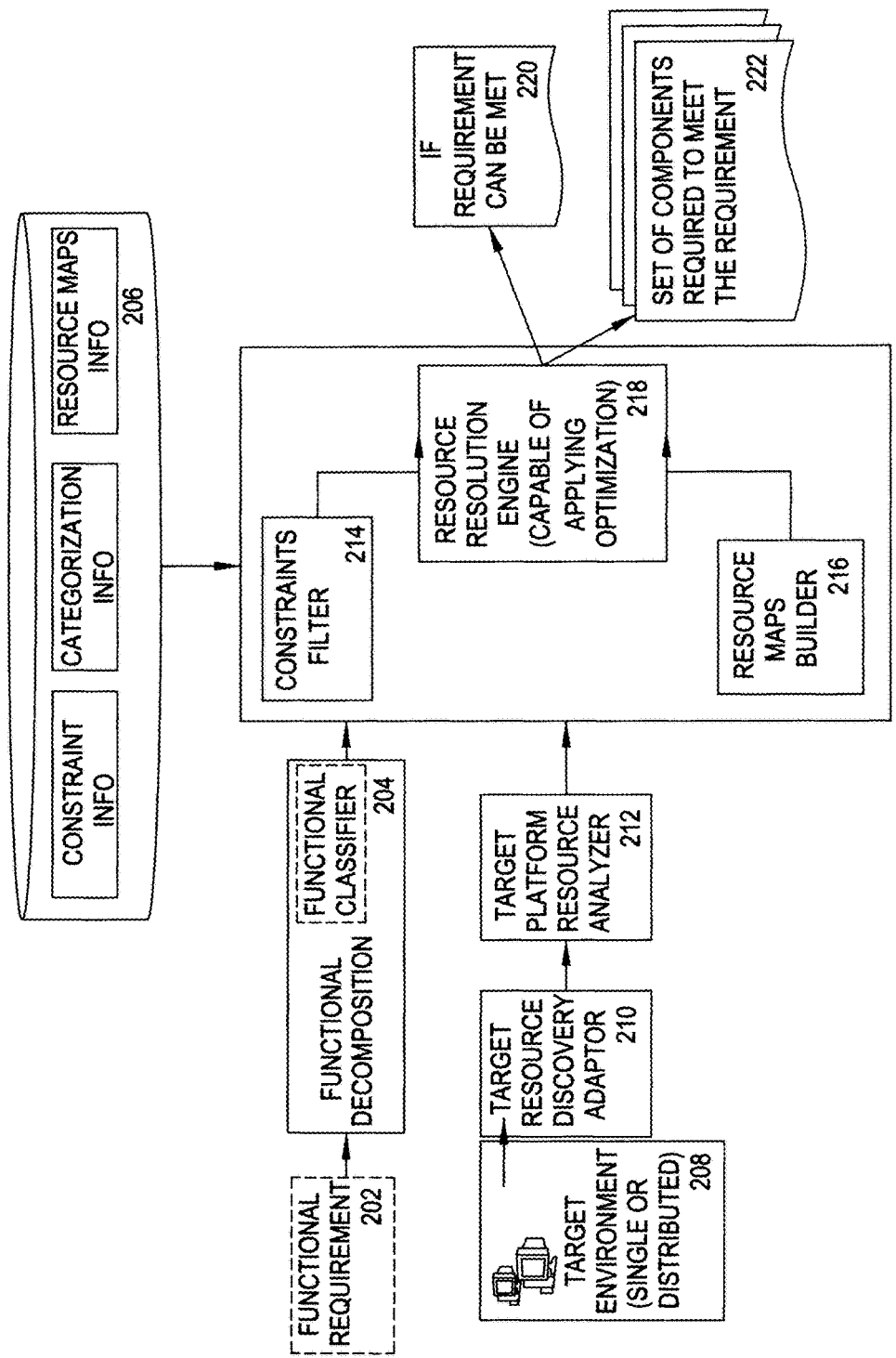
FIG. 2 schematically illustrates a resource identification system.

Turning to FIG. 2, which schematically illustrates a system configured in accordance with a presently preferred embodiment of the present invention, a functional requirement 202 intended for a target environment 208 may be input into a functional decomposition module 204. Preferably, this module 204 decomposes and categorizes (e.g., based on a language or compiler at hand) any required software or hardware modules that would be needed for "high level" functional requirements. (In accordance with at least one embodiment of the present invention, a "high level" functional requirement may be understood as an abstract representation of a function that is required to be performed, with no precise details required for execution of the same.) Preferably, a functional classifier included in module 204 may act to determine, from a user requirements, specific components and their classification. For instance, a web service might require a toolkit for compilation (e.g., "classification:Compiler"), as well as a server that serves the pages (e.g., "classification:web servers"); the functional classifier could thus act to determine and assign such classifications. A database 206 will preferably include information on constraints, categorization and resource maps and will be in communication with the functional decomposition module 204.

Constraints filter 214 will preferably act to pick up from database 206 solely those constraints which are applicable to the given target environment 208. A resource map builder 216, on the other hand, will preferably act to develop alternatives for a given requirement if not specified in the functional requirement input 202. (In other words, it is typically the case that there exist choices in terms of resources and/or implementations required for realization of the intended function. Thus, inasmuch as the functional requirement input 202 can typically represent a functional requirement desired by an end user, the resource map builder 216 can determine functional alternatives to that requirement. Sometimes if the end user requires certain resources of choice, such choices can be provided directly as input along with the functional requirement[s]). For example, the actual implementation of a web-service can be in the form of C code or Java code, and resource map builder 216 can preferably act to ascertain those alternatives.

Preferably, a resource resolution engine 218 will act to apply constraints (from filter 214) on the resource map builder 216 as would be applicable for target environment 208. For instance, if the target environment has "Java Runtime", this availability can expressed as resource constraint and the resource resolution engine 218 will determine all Java-based resources for execution.

Finally, output from the resource resolution engine 218 could indicate whether the requirement(s) in question (202) for the target environment 208 indeed can be met (220) or will output a set of components 222 that would be needed in order for the target environment 208 to meet the requirement(s) 202.

With respect to the target environment 208, a target resource discovery adapter 210 will preferably act to determine what would be the specific resources that can either represent a subset or whole set of the requirements available on the target machine. The availability and non-availability of resources on the target machines can thusly be modeled as constraints. This will assist a target platform resource analyzer 212 with determining which resources already exist at the target environment 208, which information can be provided to the resource map builder 216 to carry out its function as discussed above.

To review and further elaborate upon various aspects of at least one presently preferred embodiment of the present invention, first it will be appreciated that a functional requirement 202 may be gathered from an end user. This may simply be as abstract as specifying an end requirement without details of implementation or of resources required for realization.

Therefore, a functional decomposition module 204 preferably acts to break the function into requirements in terms of resources or usable implementation platforms. The requirements can thus be a toolkit or platform and therefore a functional classifier inherent in the module 204 preferably is employed to identify the domain or category into which each requirement would fall. For instance, a run time might be required for execution of certain components.

For a certain resource, there might exist several constraints that would have an impact on deployment issues. For instance, a simple constraint could be as follows "Db2 version 5 cannot co-exist with Web Server 3.2". This preferably will represent prior knowledge, in the form of constraint information, that is available from and included in the repository (or database) 206. In similar manner, knowledge of specific categorization (or classification) of resources can be preestablished to assist in determining which resources belongs to which categories. Thus, such information again can be made available in repository 206.

Preferably, resource map builder 216 will act to provide or determine information about which resources are available for which functions. On the other hand, the target environment 208 may preferably be scanned for available resources via target resource discovery adapter 210. For its part, target platform resource analyzer 212 may preferably act to analyze, from resources as indicated and input by adapter 210, the categories to which different resources belong (analogously to the function of the functional classifier of module 204 as discussed hereinabove).

As can be seen, target machine resources and information on functional requirements are preferably fed as separate streams of information into a "core" or "hub" that includes constraints filter 214, resource map builder 216 and resource resolution engine 218. The resource map builder 216 may build a resource map. The resultant resource map preferably will indicate which (if any) components, falling under which categories, can be used for realizing the implementation of requested functional requirements on the target platform. While the target machine might not have the exact components that would be required by the implementation, the resource resolution engine 218 preferably resolves to apply a best fit of resources on the target environment (or machine) 208 machine that can be employed while taking the resource map into account. The output of this resolution by resource resolution engine 218 preferably will either be an indication that the function can be realized (220) or an indication of one or more components that the target machine 208 would need to take on for implementation.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A system comprising:
   a resource identification tool having one or more processors and one or more modules executable by the one or more processors, the one or more modules comprising computer program code comprising:
   computer program code configured to identify software and hardware resources of a target computer platform which meet each of a plurality of predetermined functional requirements, via:
   computer program code configured to model resource constraints relating to each of the plurality of predetermined functional requirements and the target computer platform;
   the modeling including decomposing, using a functional decomposition module, each of the plurality of predetermined functional requirements into at least one of a resource component corresponding to at least one resource and platform component corresponding to a implementation platform, and functionally classifying each of the components of the predetermined functional requirement via identifying and assigning a resource category to each component;
   computer program code configured to identify constraints for each of the components, wherein the constraints are applicable to the target computer platform;
   computer program code configured to identify at least one resource meeting the constraints applicable to the target computer platform;
   computer program code configured to identify the software and hardware resources based on the identified at least one resource and identified constraints of the target computer platform;
   computer program code configured to develop a resource map comprising the identified software and hardware resources for predetermined functional requirements from the plurality of predetermined functional requirements identified as required and at least one resource alternative for predetermined functional requirements from the plurality of predetermined functional requirements identified as desired, wherein the at least one resource alternative is not specified in the functional requirement and comprises an alternative to the at least one resource; and
   computer program code configured to determine whether the plurality of predetermined functional requirements can be met based upon the resource map by applying the identified constraints to the resource map; and
   computer program code configured to, if the plurality of predetermined functional requirements can be met, output the resource map and implementing a best fit of resources available on the target computer platform corresponding to the resources identified in the output resource map; and
   computer program code configured to, if the plurality of predetermined functional requirement cannot be met, output a set of components needed to meet the plurality of predetermined functional requirements.

2. The system according to claim 1, wherein said computer program code is further configured to provide confirmation of the target computer platform successfully meeting the functional requirement.

3. The system according to claim 1, wherein said computer program code is further configured to output at least one required component for the target computer platform to successfully meet the functional requirement.

4. The system according to claim 1, wherein said computer program code is further configured to filter resource constraints such that solely those resource constraints applicable to the target computer platform are considered.

5. The system according to claim 1, wherein said computer program code is configured to determine additional resource constraints via ascertaining at least one alternative to a given resource constraint.

6. The system according to claim 1, wherein said computer program code is configured to determine additional resource constraints via ascertaining resource constraints for components available on the target computer platform.

7. The system according to claim 1, wherein said computer program code is further configured to ascertain resources already available on the target computer platform.

8. The system according to claim 7, wherein said computer program code is configured to model resource constraints via modeling resources already available on the target computer platform as constraints.

9. The system according to claim 1, wherein said computer program code is configured to assign resource constraints via employing preexisting information on functional requirement resource categories and on functional requirement resource constraints corresponding thereto.

10. The system according to claim 1, wherein said computer program code is configured to assign resource constraints via employing preexisting information on target computer platform resource categories and on functional requirement resource constraints corresponding thereto.

11. A method comprising:
executing with one or more processors one or more modules of computer program code configured for identifying software and hardware resources of a target computer platform which meet each of a plurality of predetermined functional requirements;
said identifying comprising:
modeling resource constraints relating to each of the plurality of predetermined functional requirements and the target computer platform;
said modeling comprising decomposing, using a functional decomposition module, each of the plurality of predetermined functional requirements into at least one of a resource component corresponding to at least one resource and platform component corresponding to a implementation platform, and functionally classifying each of the components of the predetermined functional requirement via identifying and assigning a resource category to each component;
identifying constraints for each of the components, wherein the constraints are applicable to the target computer platform;
identifying at least one resource meeting the constraints applicable to the target computer platform;
identifying the software and hardware resources based on the identified at least one resource and identified constraints of the target computer platform;
developing a resource map comprising the identified software and hardware resources for predetermined functional requirements from the plurality of predetermined functional requirements identified as required and at least one resource alternative for predetermined functional requirements from the plurality of predetermined functional requirements identified as desired, wherein the at least one resource alternative is not specified in the functional requirement and comprises an alternative to the at least one resource; and
determining whether the plurality of predetermined functional requirements can be met based upon the resource map by applying the identified constraints to the resource map; and
outputting, if the plurality of predetermined functional requirements can be met, the resource map and implementing a best fit of resources available on the target computer platform corresponding to the resources identified in the output resource map; and
outputting, if the plurality of predetermined functional requirement cannot be met, a set of components needed to meet the plurality of predetermined functional requirements.

12. The method according to claim 11, further comprising providing confirmation of the target computer platform successfully meeting the functional requirement.

13. The method according to claim 11, further comprising outputting at least one required component for the target computer platform to successfully meet the functional requirement.

14. The method according to claim 11, further comprising filtering resource constraints such that solely those resource constraints applicable to the target computer platform are considered.

15. The method according to claim 11, wherein said determining comprises ascertaining at least one alternative to a given resource constraint.

16. The method according to claim 11, wherein said determining comprises ascertaining resource constraints for components available on the target computer platform.

17. The method according to claim 11, further comprising ascertaining resources already available on the target computer platform.

18. The method according to claim 17, wherein said modelling comprises modelling resources already available on the target computer platform as constraints.

19. The method according to claim 11, wherein said assigning comprises employing preexisting information on functional requirement resource categories and on functional requirement resource constraints corresponding thereto.

20. The system according to claim 11, wherein said assigning comprises employing preexisting information on target computer platform resource categories and on functional requirement resource constraints corresponding thereto.

21. A computer program product comprising:
a non-transitory computer readable storage medium having computer readable program code embodied therewith, the computer readable storage medium comprising:
computer program code configured to identify software and hardware resources of a target computer platform which meet each of a plurality of predetermined functional requirements, via:
computer program code configured to model resource constraints relating to each of the plurality of predetermined functional requirements and the target computer platform;
the modeling including decomposing, using a functional decomposition module, each of the plurality of predetermined functional requirements into at least one of a resource component corresponding to at least one resource and platform component corresponding to a implementation platform, and functionally classifying each of the components of the predetermined functional requirement via identifying and assigning a resource category to each component;
computer program code configured to identify constraints for each of the components, wherein the constraints are applicable to the target computer platform;
computer program code configured to identify at least one resource meeting the constraints applicable to the target computer platform;
computer program code configured to identify the software and hardware resources based on the identified at least one resource and identified constraints of the target computer platform;
computer program code configured to develop a resource map comprising the identified software and hardware resources for predetermined functional requirements from the plurality of predetermined functional requirements identified as required and at least one resource alternative for predetermined functional requirements from the plurality of predetermined functional requirements identified as desired, wherein the at least one resource alternative is not specified in the functional requirement and comprises an alternative to the at least one resource; and
computer program code configured to determine whether the plurality of predetermined functional requirements can be met based upon the resource map by applying the identified constraints to the resource map; and
computer program code configured to, if the plurality of predetermined functional requirements can be met, output the resource map and implementing a best fit of resources available on the target computer platform corresponding to the resources identified in the output resource map; and computer program code configured to, if the plurality of predetermined functional requirement cannot be met, output a set of components needed to meet the plurality of predetermined functional requirements.

22. The computer program product according to claim 21, wherein said computer program code is further configured to provide confirmation of the target computer platform successfully meeting the functional requirement.

23. The computer program product according to claim 21, wherein said computer program code is further configured to output at least one required component for the target computer platform to successfully meet the functional requirement.

24. The computer program product according to claim 21, wherein said computer program code is further configured to filter resource constraints such that solely those resource constraints applicable to the target computer platform are considered.

25. The computer program product according to claim 21, wherein said computer program code is configured to determine additional resource constraints via ascertaining at least one alternative to a given resource constraint.

* * * * *